US012656809B2

(12) United States Patent
Ninomiya

(10) Patent No.: US 12,656,809 B2
(45) Date of Patent: Jun. 16, 2026

(54) MULTI-DIRECTIONAL INPUT DEVICE HAVING A PERMANENT MAGNET

(71) Applicant: Alps Alpine Co., Ltd., Tokyo (JP)

(72) Inventor: Nobuyuki Ninomiya, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/826,395

(22) Filed: Sep. 6, 2024

(65) Prior Publication Data

US 2025/0103085 A1 Mar. 27, 2025

(30) Foreign Application Priority Data

Sep. 22, 2023 (JP) ................................ 2023-158221

(51) Int. Cl.
*G05G 9/047* (2006.01)
*G05G 5/04* (2006.01)

(52) U.S. Cl.
CPC ............... *G05G 9/047* (2013.01); *G05G 5/04* (2013.01); *G05G 2009/04755* (2013.01)

(58) Field of Classification Search
CPC . G05G 9/047; G05G 5/04; G05G 2009/04755
See application file for complete search history.

(56) References Cited

U.S. PATENT DOCUMENTS

| | | | | |
|---|---|---|---|---|
| 8,186,240 B2 * | 5/2012 | Sakai | ..................... | A43B 21/42 345/161 |
| 2023/0032914 A1 * | 2/2023 | Asano | .................. | G06F 3/0338 |

FOREIGN PATENT DOCUMENTS

| | | | |
|---|---|---|---|
| JP | 2009-139252 A | 6/2009 | |

* cited by examiner

*Primary Examiner* — Minnah L Seoh
*Assistant Examiner* — Gregory T Prather
(74) *Attorney, Agent, or Firm* — Harness, Dickey & Pierce, P.L.C.

(57) ABSTRACT

An input device has: a fixed base; a case positioned on the fixed base; a movable body supported on the fixed base by the case so as to be movable in a direction crossing the up-down direction; a magnetic field generation means, for generating a magnetic field downward, attached to the movable body; and a magnetic field direction detection means for detecting the direction of a magnetic field component along a virtual plane crossing the up-down direction, the magnetic field direction detection means being disposed, on the fixed base, at other than the position of a virtual central line of the magnetic field with the movable body being at a reference position. The magnetic field generation means includes a permanent magnet, one pole of which faces downward, and also includes a magnetic portion placed apart from the virtual central line of the magnetic field with space being left between them.

4 Claims, 13 Drawing Sheets

MULTI-DIRECTIONAL INPUT DEVICE HAVING A PERMANENT MAGNET

CLAIM OF PRIORITY

This application claims benefit of Japanese Patent Application No. 2023-158221 filed on Sep. 22, 2023, which is hereby incorporated by reference in its entirety.

BACKGROUND OF THE INVENTION

1. Field of the Invention

The present invention relates to an input device in which magnetic sensors are used.

2. Description of the Related Art

Japanese Unexamined Patent Application Publication No. 2009-139252 discloses a position sensor that can stably detect a two-dimensional position by non-contact. This positions sensor has: a manipulation unit that commands a two-dimensional position when a tilting manipulation is performed; a counter magnet disposed in the manipulation unit, the counter magnet being magnetized in a direction perpendicular to a direction in which a manipulation is performed; a magnetic sensor in which half bridge circuits, each of which is composed of first and second magneto-resistance elements with magnetism-sensing directions being orthogonal to each other, are disposed at the vertexes of a cross shape as first to fourth half bridges, the magnetic sensor outputting a first output voltage from the first and third half bridges, which face each other, and a second output voltage from the second and fourth half bridges, which face each other, according to a change in the direction of a magnetic field based on a tilting manipulation; and a detection unit that that detects the two-dimensional position commanded by the tilting manipulation, according to the first and second output voltages output from the magnetic sensor.

In an input device in which a magnetic sensor is used to detect the state of the movement of a movable body according to a change in the direction of a magnetic field, if the amount of magnetic field component along a virtual plane crossing the virtual central line of the magnetic field is small, the signal-to-noise (S/N) ratio of an output signal from the magnetic sensor becomes low. To prevent this, it is desirable to increase the amount of magnetic field component along a virtual plane crossing the virtual central line of the magnetic field so that the magnetic sensor can be used to effectively detect the state of the movement of the movable body.

SUMMARY OF THE INVENTION

The present invention provides an input device, which is a type of input device that detects the state of the movement of a movable body according to a change in the direction of a magnetic field, by which a sufficient S/N ratio can be obtained with a magnetic sensor.

An input device in an aspect of the present invention has: a fixed base; a case positioned on the upper side of the fixed base, the upper side being one side in the direction of a normal to the fixed base; a movable body supported on the upper side of the fixed base by the case so as to be movable in a direction crossing the direction of the normal; a magnetic field generation means for generating a magnetic field oriented toward a lower side, which is another side in the direction of the normal, the magnetic field generation means being attached to the movable body; and a magnetic field direction detection means for detecting the direction of a magnetic field component along a virtual plane crossing the up-down direction, the magnetic field direction detection means being disposed at a position, on the fixed base, other than the position of a virtual central line of the magnetic field with the movable body being at a reference position. The magnetic field generation means includes a permanent magnet, one pole of which faces downward, and also includes a magnetic portion placed apart from the virtual central line of the magnetic field with space being left between the magnetic portion and the virtual central line.

In the permanent magnet and magnetic portion, in the above structure, which constitute the magnetic field generation means, since the magnetic portion is placed apart from the virtual central line of the magnetic field with space being left between the magnetic portion and the virtual central line, the amount of magnetic field component along the virtual plane crossing the virtual central line of the magnetic field is increased. This increases the S/N ratio of the magnetic field components detected by the magnetic field direction detection means.

In the above input device, the magnetic field generation means may be composed of a yoke member and a permanent magnet, the yoke member being composed of a discal top plate and a ring-shaped magnetic portion formed so as to extend downward from the outer circumference of the discal top plate, the permanent magnet being attached to the lower surface of the discal top plate. Thus, the yoke member, which includes the ring-shaped magnetic portion, suppresses the magnetic field from leaking on the side opposite to a detection area covered by the magnetic field direction detection means. Therefore, the magnetic flux density is increased in the detection area.

In the above input device, the ring-shaped magnetic portion may be formed so as to extend downward while being widened toward the lower end. When the ring-shaped magnetic portion is formed so as to extend downward while being widened toward the lower end, that is, so that the ring diameter is increased toward the lower end, the manufacturing of the ring-shaped magnetic portion is eased.

In the above input device, it is preferable for the diameter of the discal top plate to be approximately equal to the diameter of the permanent magnet. When the diameter of the discal top plate is approximately equal to the diameter of the permanent magnet, the permanent magnet is easily positioned in the ring-shaped magnetic portion.

The above input device preferably further has a restriction means for restricting the movable range of the movable body. The movable range is preferably a range in which the magnetic field direction detection means is positioned between the magnetic portion and the virtual central line of the magnetic field when viewed from the top. Thus, within the movable range of the movable body, the magnetic field direction detection means is always positioned between the magnetic portion and the virtual central line of the magnetic field when viewed from the top.

An input device in another aspect of the present invention has: a fixed base; a case positioned on the upper side of the fixed base, the upper side being one side in the direction of a normal to the fixed base; a movable body supported on the upper side of the fixed base by the case so as to be movable in a direction crossing the direction of the normal; a magnetic field generation means for generating a magnetic field oriented toward a lower side, which is another side in the direction of the normal, the magnetic field generation means being attached to the movable body; and a magnetic field direction detection means for detecting the direction of a magnetic field component along a virtual plane crossing the up-down direction, the magnetic field direction detection means being disposed at a position, on the fixed base, other than the position of a virtual central line of the magnetic field with the movable body being at a reference position. The magnetic field generation means includes a permanent magnet, one pole of which faces downward, and also includes a magnetic portion attached to the end of the one pole so as to include the virtual central line of the magnetic field.

In the permanent magnet and magnetic portion, in the above structure, which constitute the magnetic field generation means, since the magnetic portion is attached to the end of one pole of the permanent magnet so as to include the virtual central line of the magnetic field, the amount of magnetic field component along the virtual plane crossing the virtual central line of the magnetic field is increased. This increases the S/N ratio of the magnetic field components detected by the magnetic field direction detection means.

In the above input device, the movable body may be composed of a swing lever and a flat slider, the swing lever being supported so as to be swingable around a direction, taken as a central axis, that crosses the up-down direction, the flat slider sliding along a plane crossing the up-down direction in response to the motion of the swing lever. The permanent magnet may be attached to the flat slider. Thus, even when a swing manipulation is performed by use of the swing lever, the distance between the magnetic field generation means and the magnetic field direction detection means in the up-down direction remains unchanged. In the swing manipulation, therefore, the linearity of the magnetic field component detected by the magnetic field direction detection means is enhanced.

According to the present invention, it is possible to provide an input device, which is a type of input device that detects the state of the movement of a movable body according to a change in the direction of a magnetic field, by which a sufficient S/N ratio can be obtained with a magnetic sensor.

DESCRIPTION OF THE PREFERRED EMBODIMENTS

Figure 1:
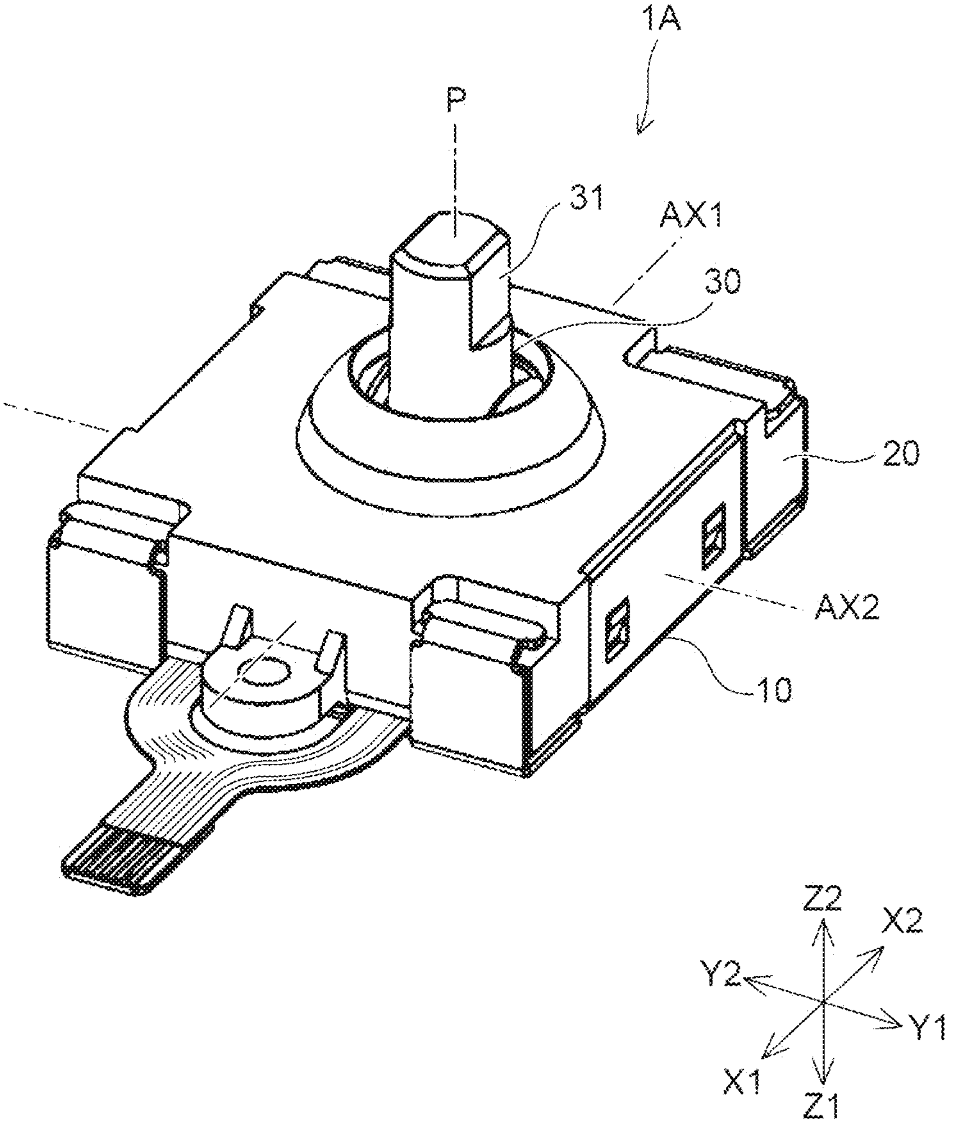
FIG. 1 is a perspective view illustrating the outside shape of an input device in a first embodiment.

Embodiment of the present invention will be described below in detail with reference to the attached drawings. In the descriptions below, like members will be denoted by like reference characters and repeated descriptions will be appropriately omitted for members that have been described once.

First Embodiment

FIG. 1 is a perspective view illustrating the outside shape of an input device in a first embodiment.

Figure 2:
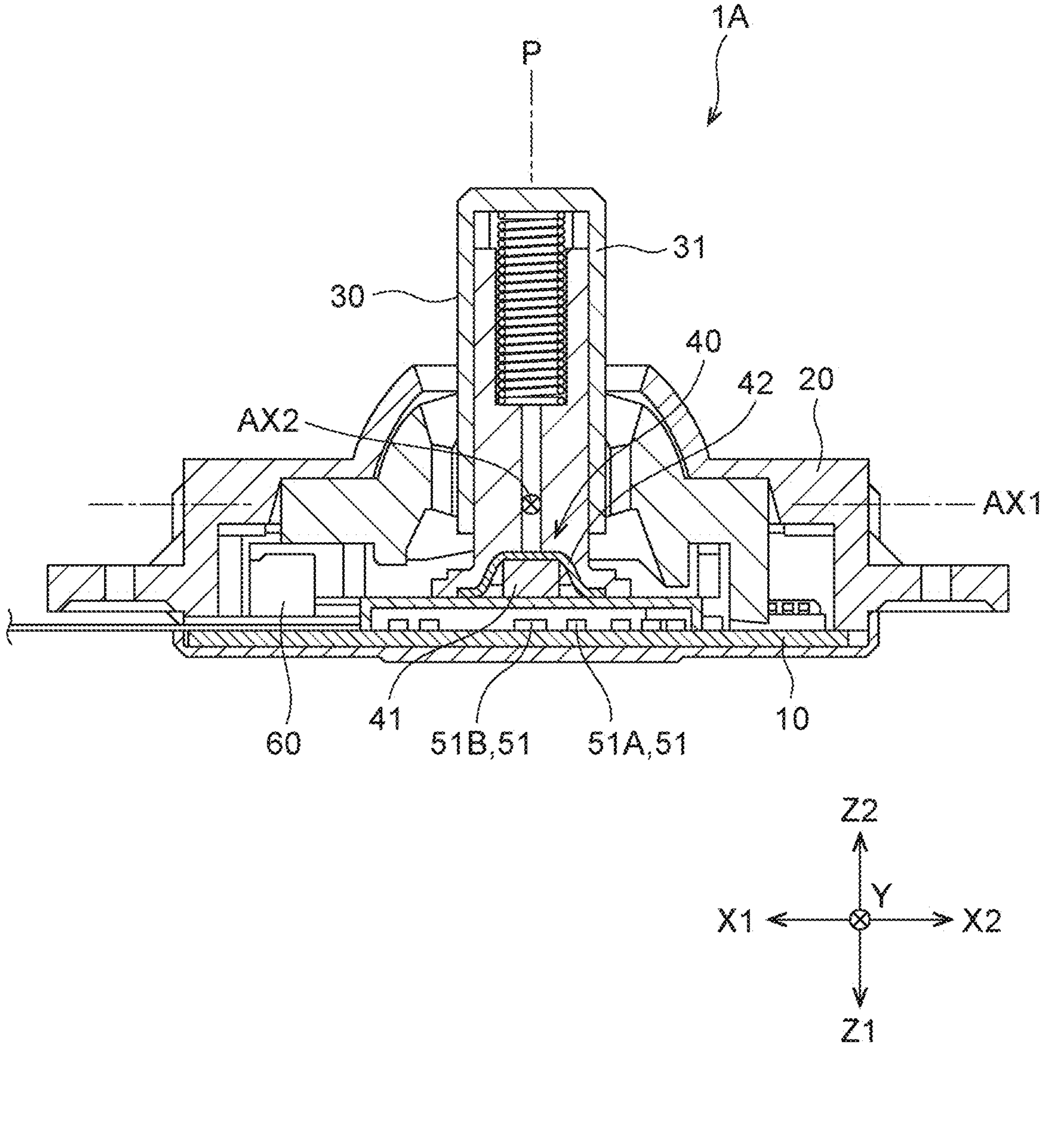
FIG. 2 is a sectional view illustrating the input device in the first embodiment.

FIG. 2 is a sectional view illustrating the input device in the first embodiment.

The input device 1A in the first embodiment detects a rotational manipulation performed for a swing lever 31, which is an example of a manipulation member. The input device 1A has a fixed base 10 as well as a case 20 positioned on one side (Z2 side) of the fixed base 10 in the direction of a normal to the fixed base 10 (Z1-Z2 direction). In this embodiment, the direction of the normal to the fixed base 10 (Z1-Z2 direction) will be taken as the up-down direction; the Z2 side, which is one side in the Z1-Z2 direction, will be taken as the upper side; and the Z1 side, which is the other side in the Z1-Z2 direction, will be taken as the lower side. One of directions crossing (orthogonal to, for example) the direction of the normal (Z1-Z2 direction) will be taken as the X1-X2 direction. A direction crossing (orthogonal to, for example) the Z1-Z2 direction and X1-X2 direction will be taken as the Y1-Y2 direction.

The input device 1A also has a movable body 30, which is supported on the upper side of the fixed base 10 by the case 20 so as to be movable in a direction crossing the direction of the normal (Z1-Z2 direction), a magnetic field generation means for generating a magnetic field oriented downward (toward the Z1 side in the Z1-Z2 direction), the magnetic field generation means 40 being attached to the movable body 30, and magnetic sensors 51 disposed on the upper side of the fixed base 10. The movable body 30 has a swing lever 31 supported so as to be swingable around a direction, taken as a central axis, that crosses the up-down direction. In this embodiment, the swing lever 31 is supported so as to be swingable around a rotational axis AX1, taken as a central axis, which is parallel to the X1-X2 direction, and around a rotational axis AX2, taken as another central axis, which is parallel to the Y1-Y2 direction. The swing lever 31 is tiltable concurrently around the rotational axis AX1 and rotational axis AX2, which are taken as central axes. Therefore, the swing lever 31 is tiltable in a direction at any angle within 360 degrees with respect to the direction of the normal to the fixed base 10 (Z1-Z2 direction).

When the swing lever 31 is not manipulated, it is erected in the Z1-Z2 direction. The position of the swing lever 31 in this state is the neutral position. When a force is applied to the swing lever 31, the swing lever 31 tilts around its central axis. When the applied force is removed, the swing lever 31 returns to the neutral position. The neutral position of the swing lever 31 is a reference position.

The swing lever 31 may be supported so as to be movable in the up-down direction (this movement is a push motion). The downward movement of the swing lever 31 is transmitted to and detected by a switch 60 provided on the fixed base 10.

Each magnetic sensor 51 is an example of a magnetic field direction detection means. On the fixed base 10, the magnetic sensors 51 are disposed at positions other than the position of a virtual central line P (see FIG. 3) of a magnetic field with the swing lever 31 of the movable body 30 being at the reference position. The magnetic sensors 51 detect the direction of a magnetic field component along a virtual plane F (see FIG. 4A) crossing the up-down direction.

In the input device 1A in this embodiment, the magnetic field generation means 40 has a permanent magnet 41 and a first magnetic portion 42. The permanent magnet 41 is placed so that its one pole (the N pole, for example) faces downward. For example, the permanent magnet 41 is placed the lower end of the swing lever 31 in the direction in which the swing lever 31 extends. The first magnetic portion 42 is placed apart from the virtual central line P of the magnetic field with space being left between the first magnetic portion 42 and the virtual central line P. The first magnetic portion 42 will be described later in detail.

Figure 3:
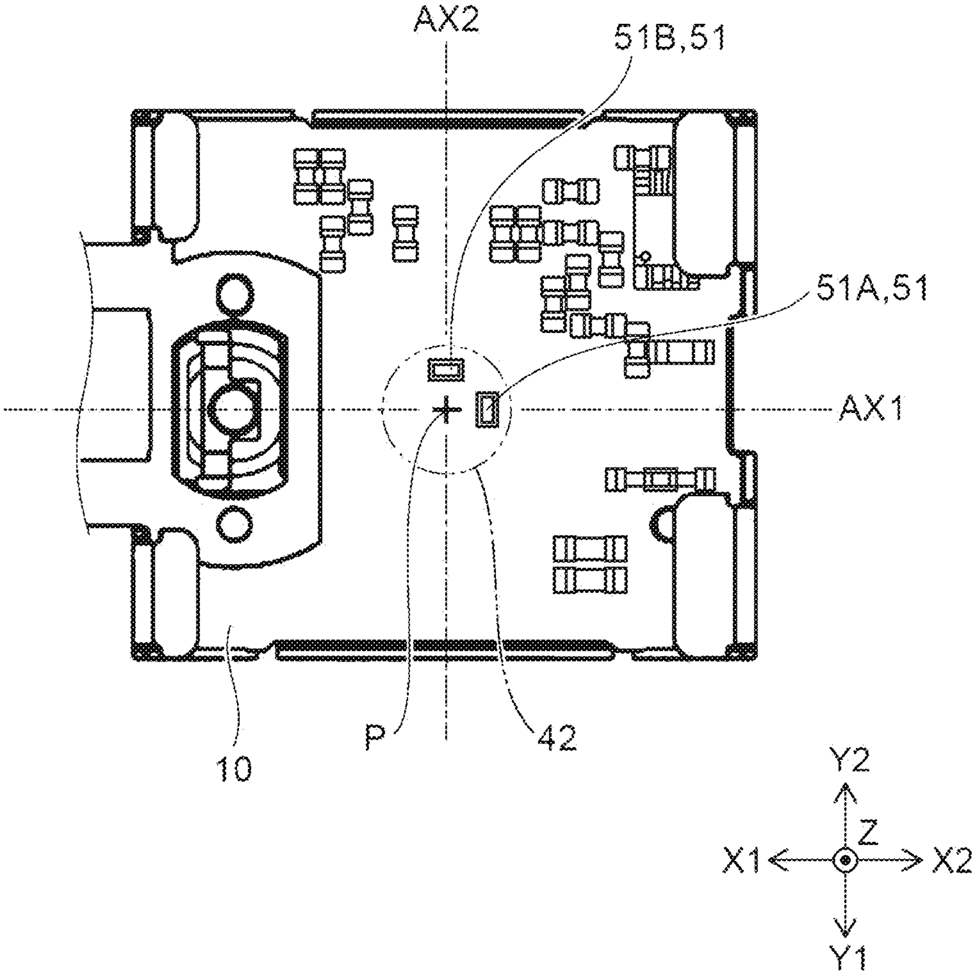
FIG. 3 is a plan view illustrating the placement of magnetic sensors.

FIG. 3 is a plan view illustrating the placement of magnetic sensors.

In FIG. 3, the magnetic sensors 51 are placed on the fixed base 10.

In this embodiment, two magnetic sensors 51, first magnetic sensor 51A and second magnetic sensor 51B, are provided. For convenience of explanation, when the first magnetic sensor 51A and second magnetic sensor 51B are not distinguished from each other, they will be collectively referred to as the magnetic sensor 51.

In this embodiment, the swing lever 31 is supported so as to be swingable around the rotational axis AX1, taken as a central axis, which is parallel to the X1-X2 direction, and around the rotational axis AX2, taken as another central axis, which is parallel to the Y1-Y2 direction. Therefore, when the direction of a magnetic field changes due to a tilt of the swing lever 31 around the rotational axis AX1 (a tilt toward the Y1 or Y2 side), the change is detected by the first magnetic sensor 51A. Similarly, when the direction of a magnetic field changes due to a tilt of the swing lever 31 around the rotational axis AX2 (a tilt toward the X1 or X2 side), the change is detected by the second magnetic sensor 51B.

As described above, the swing lever 31 is tiltable in a direction at any angle within 360 degrees with respect to the direction of the normal to the fixed base 10 (Z1-Z2 direction). Therefore, when the direction of a magnetic field changes according to the direction of the tilt of the swing lever 31 and to the angle of the tilt, the first magnetic sensor 51A detects the change in the direction of the magnetic field in the X1-X2 direction and the second magnetic sensor 51B detects the change in the direction of the magnetic field in the Y1-Y2 direction. From these detection results, the direction of the tilt of the swing lever 31 and the angle of the tilt are detected.

In this embodiment, on the fixed base 10, the first magnetic sensor 51A and second magnetic sensor 51B are disposed at positions other than the position of the virtual central line P of the magnetic field with the swing lever 31 being at the reference position, as illustrated in FIG. 3. The first magnetic portion 42 is placed apart from the virtual central line P of the magnetic field with space being left between the first magnetic portion 42 and the virtual central line P, as indicated by the dash-dot-dot line in FIG. 3. The dash-dot-dot line in FIG. 3 indicates the outside shape of the first magnetic portion 42 when viewed in the Z1-Z2 direction. In this placement, the amount of magnetic field component along the virtual plane F (see FIG. 4B) crossing the virtual central line P of the magnetic field is increased. This can increase the S/N ratio of the magnetic field components detected by the first magnetic sensor 51A and second magnetic sensor 51B.

Figure 4A:
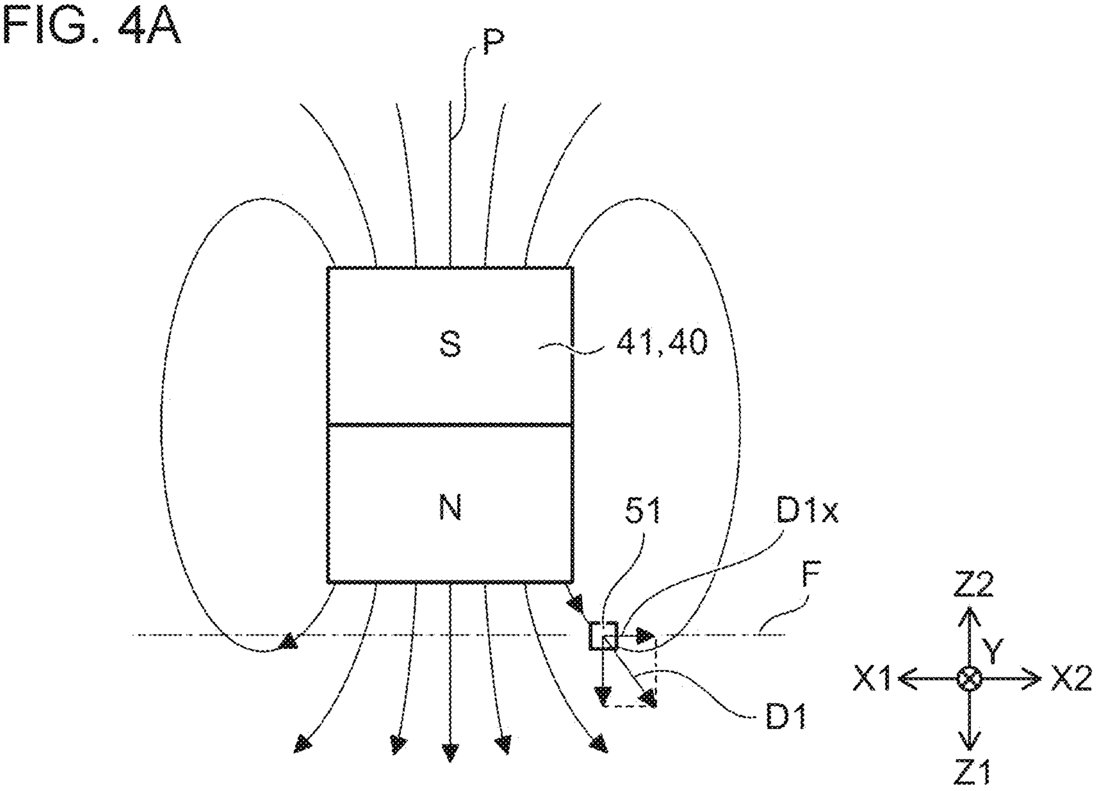
FIG. 4A schematically illustrates a magnetic field generated by a permanent magnet.

FIG. 4A schematically illustrates a magnetic field generated by a permanent magnet.

Figure 4B:
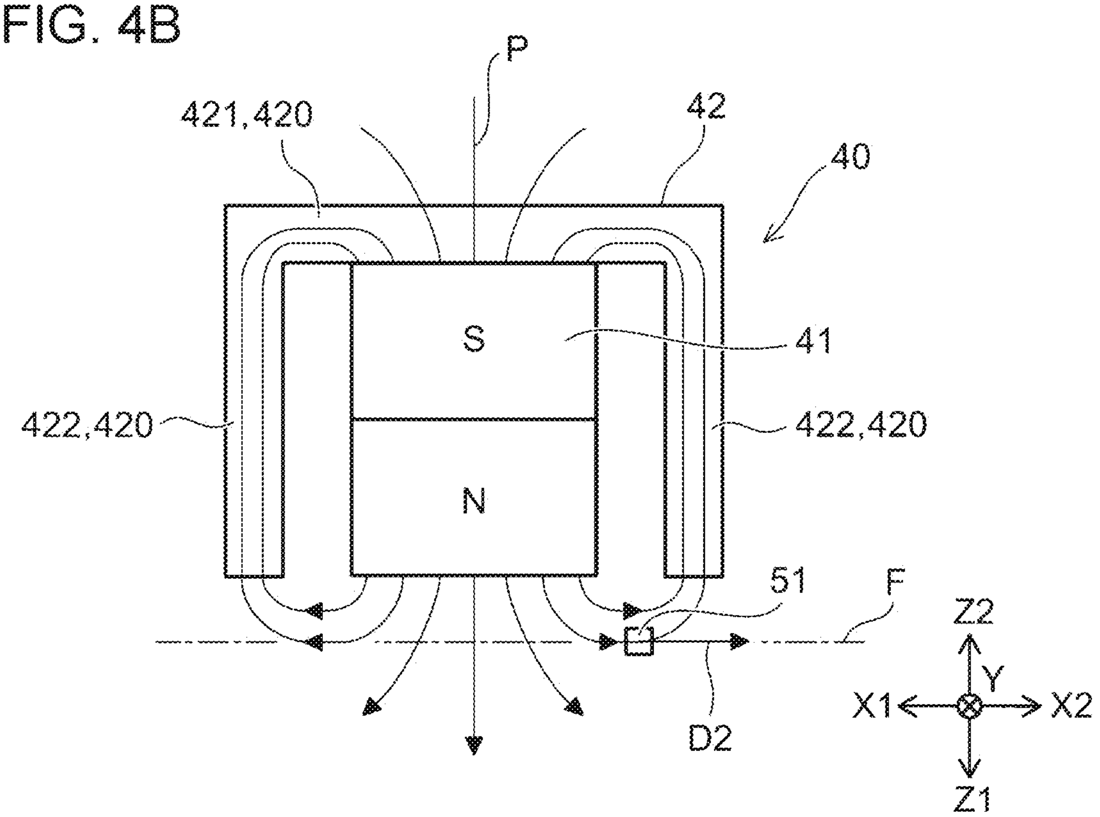
FIG. 4B schematically illustrates a magnetic field generated by a magnetic field generation means.

FIG. 4B schematically illustrates a magnetic field generated by a magnetic field generation means.

As illustrated in FIG. 4A, a magnetic field is generated by the permanent magnet 41, which is included in the magnetic field generation means 40, so that magnetic lines of force draw arcs from the N pole toward the S pole. When, at a distance from the virtual central line P of the magnetic field, the magnetic sensor 51 is placed for the permanent magnet 41, the magnetic line of force that passes through the magnetic sensor 51 is oriented diagonally downward (see the arrow D1 in FIG. 4A). Therefore, the strength of the magnetic force detectable by the magnetic sensor 51, the magnetic force being along the virtual plane F orthogonal to the virtual central line P, is the strength of a component (see the arrow D1*x* in FIG. 4A) along the virtual plane F, the component being part of the magnetic line of force that passes through the magnetic sensor 51 and is oriented diagonally downward.

In contrast to this, with the magnetic field generation means 40 in this embodiment, the first magnetic portion 42 is placed apart from the virtual central line P of the magnetic field with space being left between the first magnetic portion 42 and the virtual central line P, as illustrated in FIG. 4B. For example, the first magnetic portion 42 is a yoke member 420, which is composed of a discal top plate 421 and a ring-shaped magnetic portion 422 formed so as to extend downward from the outer circumference of the discal top plate 421.

When the yoke member 420 of this type is provided, the magnetic flux density of magnetic lines of force oriented from the end of the N pole toward the end of the yoke member 420 is increased in a magnetic field generated by the permanent magnet 41, which is included in the magnetic field generation means 40. In addition, the discal top plate 421 of the yoke member 420 suppresses the magnetic field from leaking on the side opposite to a detection area covered by the magnetic sensor 51 (the side is on the Z2 side in the Z1-Z2 direction). In the magnetic field, therefore, the magnetic flux density of the component along the virtual plane F is further increased. When, at a distance from the virtual central line P of the magnetic field, the magnetic sensor 51 is placed for the magnetic field generation means 40, the magnetic force along the virtual plane F becomes higher than when the yoke member 420 is not provided as in FIG. 4A (see the arrow D2 in FIG. 4B). This increases the S/N ratio of the magnetic field component detected by the magnetic sensor 51.

The ring-shaped magnetic portion 422 does not necessarily need to be continuous in the circumferential direction. For example, the ring-shaped magnetic portion 422 may have a C-ring shape or half-ring shape, in which part of the ring-shaped magnetic portion 422 is cut out in the circumferential direction.

Figure 5A:
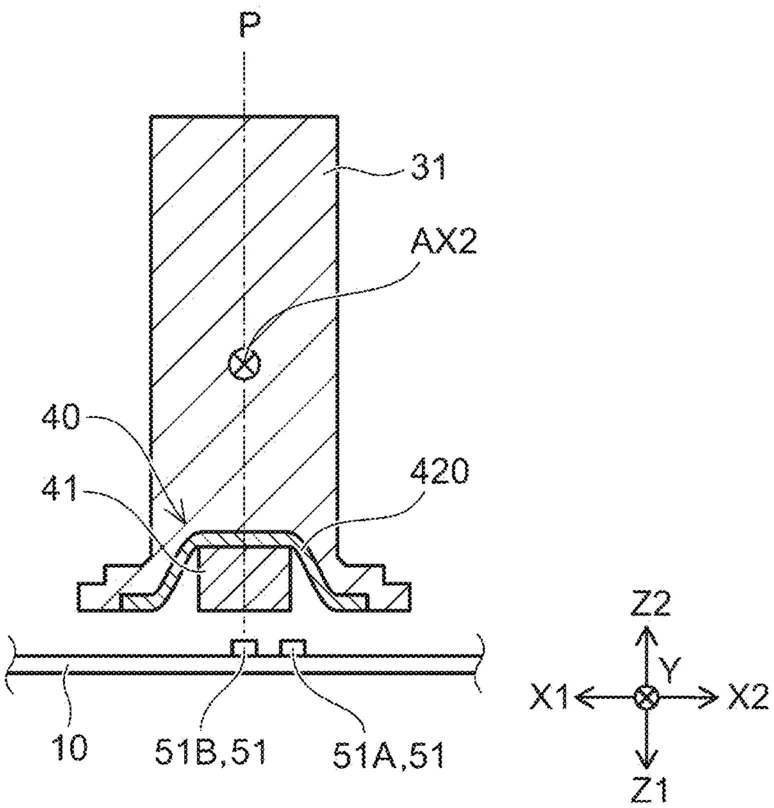
FIG. 5A schematically illustrates detection of a magnetic field direction by the magnetic sensors.
Figure 5B:
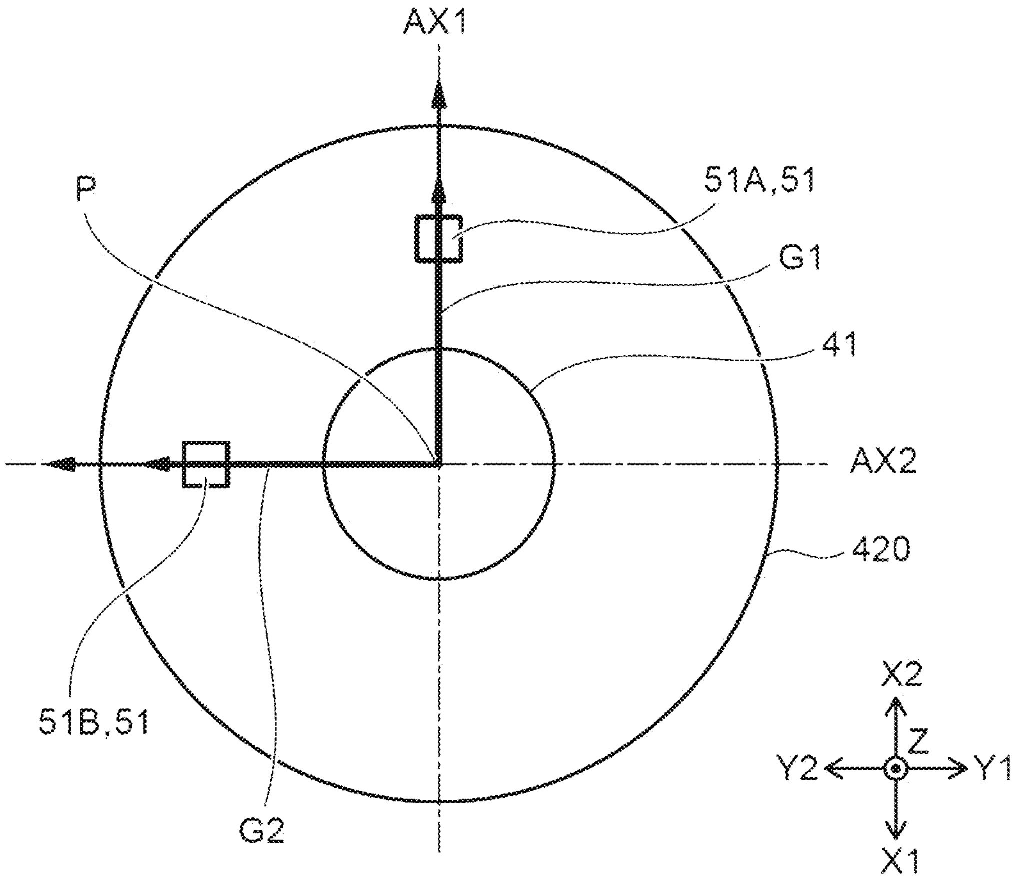
FIG. 5B also schematically illustrates detection of a magnetic field direction by the magnetic sensors.
Figure 6A:
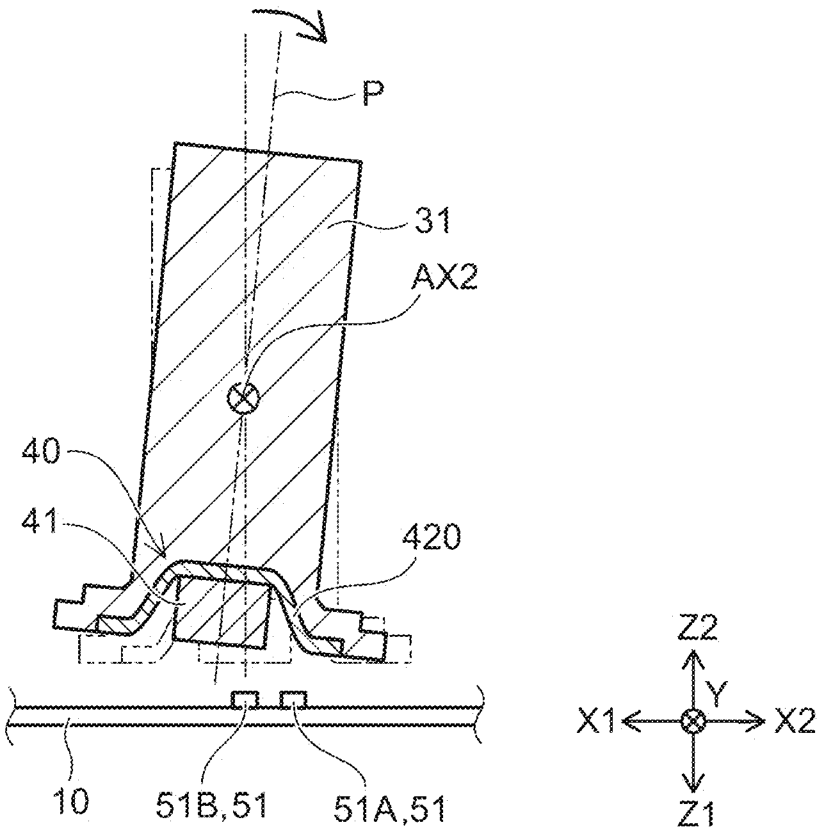
FIG. 6A also schematically illustrates detection of a magnetic field direction by the magnetic sensors.
Figure 6B:
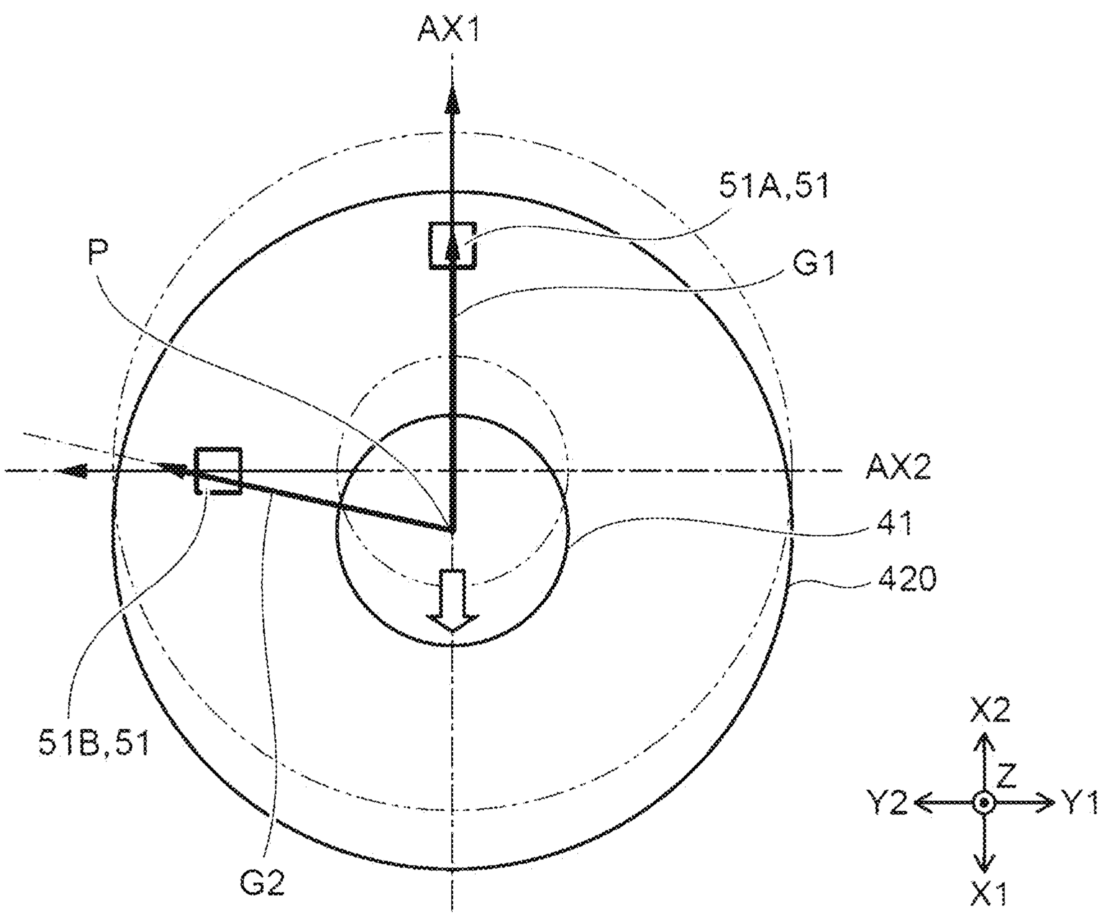
FIG. 6B also schematically illustrates detection of a magnetic field direction by the magnetic sensors.

FIGS. 5A to 6B schematically illustrate detection of a magnetic field direction by the magnetic sensors. FIG. 5A is a schematic sectional view when the swing lever 31 is at the reference position (neutral position). FIG. 5B illustrates a positional relationship among the magnetic sensors 51, permanent magnet 41, and yoke member 420 with the swing lever 31 being at the reference position (neutral position) when viewed from the Z1-Z2 direction. FIG. 6A is a schematic sectional view when the swing lever 31 is tilted in one direction. FIG. 6B illustrates a positional relationship among the magnetic sensors 51, permanent magnet 41, and yoke member 420 with the swing lever 31 being tilted in the one direction when viewed from the Z1-Z2 direction.

The first magnetic sensor 51A and second magnetic sensor 51B are placed at positions other than the position of the virtual central line P of the magnetic field generated by the magnetic field generation means 40 and inside the outer circumference of the yoke member 420, when viewed from the Z1-Z2 direction.

When the swing lever 31 is at the reference position (neutral position), the first magnetic sensor 51A is positioned on a line that is parallel to the X1-X2 direction and passes through the center of the permanent magnet 41 and the second magnetic sensor 51B is positioned on a line that is parallel to the Y1-Y2 direction and passes through the center of the permanent magnet 41, as illustrated in FIGS. 5A and 5B. Therefore, a magnetic line G1 of force that passes through the first magnetic sensor 51A is parallel to the X1-X2 direction; and a magnetic line G2 of force that passes through the second magnetic sensor 51B is parallel to the Y1-Y2 direction.

When the upper side of the swing lever 31 is tilted toward the X2 side in the X1-X2 direction, the permanent magnet 41 and yoke member 420 placed on the lower side of the swing lever 31 move toward the X1 side in the X1-X2 direction, as illustrated in FIGS. 6A and 6B. In this case, the magnetic line G1 of force that passes through the first magnetic sensor 51A remains parallel to the X1-X2 direction, but the magnetic line G2 of force that passes through the second magnetic sensor 51B is inclined by a predetermined angle with respect to the Y1-Y2 direction. When a change in the magnetic field angle detected by the second magnetic sensor 51B (a change in angle with respect to the magnetic field angle detected when the swing lever 31 is at the reference position as illustrated in FIGS. 5A and 5B) is detected, an angle by which the swing lever 31 has been tilted in the X1-X2 direction can be detected.

Although not illustrated, when the upper side of the swing lever 31 is tilted in the Y1-Y2 direction, the magnetic line G2 of force that passes through the second magnetic sensor 51B remains parallel to the Y1-Y2 direction, but the magnetic line G1 of force that passes through the first magnetic sensor 51A is inclined by a predetermined angle with respect to the X1-X2 direction. When a change in the magnetic field angle detected by the first magnetic sensor 51A (a change in angle with respect to the magnetic field angle detected when the swing lever 31 is at the reference position as illustrated in FIGS. 5A and 5B) is detected, an angle by which the swing lever 31 has been tilted in the Y1-Y2 direction can be detected.

When the upper side of the swing lever 31 is tilted at an oblique angle when viewed in the Z1-Z2 direction (in a direction other than the X1-X2 direction and Y1-Y2 direction), a change occurs both in the magnetic field angle detected by the first magnetic sensor 51A and in the magnetic field angle detected by second magnetic sensor 51B. When computations are performed according to the amounts of these changes in the magnetic field angle detected by the first magnetic sensor 51A and in the magnetic field angle detected by the second magnetic sensor 51B, an angle by which the swing lever 31 has been tilted can be detected.

A restriction means for restricting the movable range of the swing lever 31 may be provided so that the magnetic sensor 51 is positioned between the first magnetic portion 42 and the virtual central line P of the magnetic field when viewed in the Z1-Z2 direction, regardless of the position of the swing lever 31 within the movable range. Thus, within the movable range of the swing lever 31, the magnetic sensor 51 is always positioned between the first magnetic portion 42 and the virtual central line P of the magnetic field when viewed from the top. This can increase the S/N ratio of the magnetic field component detected by the magnetic sensor 51, regardless of an angle by which the swing lever 31 is tilted.

Figure 7:
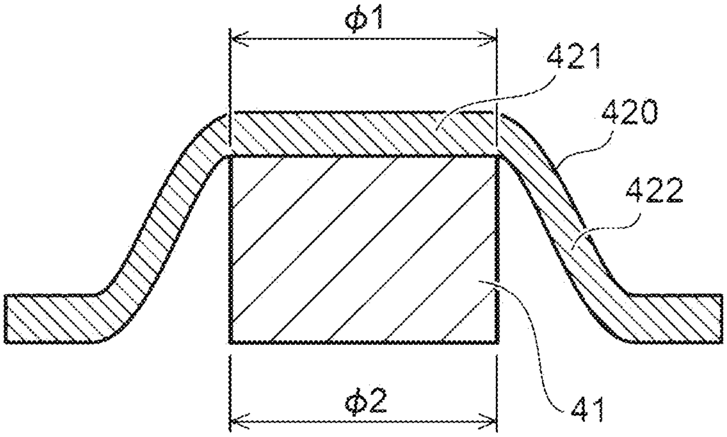
FIG. 7 schematically illustrates an example of a yoke member.

FIG. 7 schematically illustrates an example of a yoke member.

The yoke member 420 has the discal top plate 421 placed on the upper side of the permanent magnet 41, and also has the ring-shaped magnetic portion 422 formed so as to extend downward from the outer circumference of the discal top plate 421. The ring-shaped magnetic portion 422 of this type may be formed so as to extend downward while being widened toward the lower end. When the ring-shaped magnetic portion 422 is formed so as to extend downward while being widened toward the lower end, that is, so that the ring diameter is increased toward the lower end, the manufacturing of the ring-shaped magnetic portion 422 is eased. Specifically, when the yoke member 420 is formed from a metal material, the ring-shaped magnetic portion 422 intended to be widened toward the lower end can be formed by simple stamping without having to perform deep drawing.

With the yoke member 420, it is preferable for the diameter $\phi$1 of the discal top plate 421 to be approximately equal to the diameter $\phi$2 of the permanent magnet 41. When the diameter $\phi$1 of the discal top plate 421 is approximately equal to the diameter $\phi$2 of the permanent magnet 41, the permanent magnet 41 is aligned with the discal top plate 421, which forms the bottom of the recess of the yoke member 420. Therefore, the permanent magnet 41 is easily positioned in the yoke member 420.

Second Embodiment

Figure 8A:
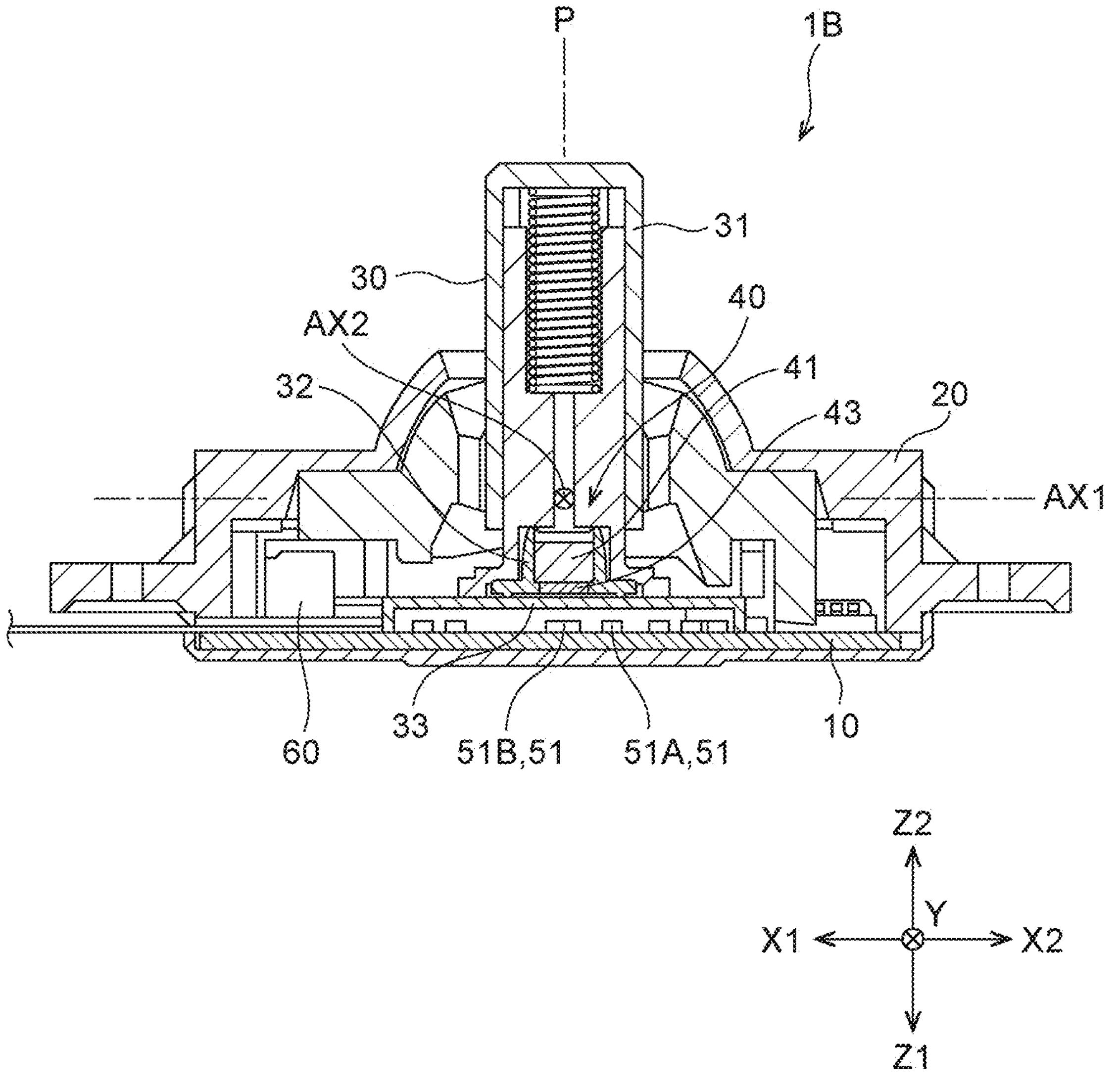
FIG. 8A is a sectional view illustrating an input device in a second embodiment.
Figure 8B:
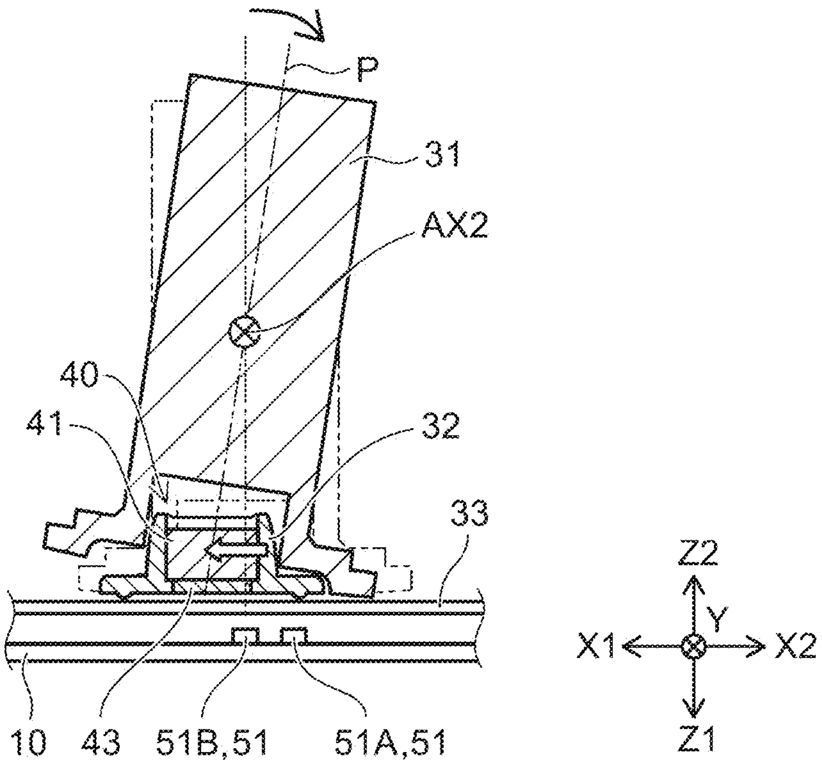
FIG. 8B is a schematic sectional view illustrating the motion of the input device in the second embodiment.

FIGS. 8A and 8B are each a sectional view illustrating an input device in a second embodiment.

Specifically, FIG. 8A is a sectional view illustrating the input device 1B in the second embodiment, and FIG. 8B is a schematic sectional view illustrating the motion of the input device 1B in the second embodiment.

In the input device 1B in the second embodiment, the magnetic field generation means 40 includes the permanent magnet 41, one pole of which faces downward, and also includes a second magnetic portion 43 attached to the end of the one pole of the permanent magnet 41 so as to include the virtual central line P of the magnetic field. Specifically, the permanent magnet 41 is placed on the lower side of the swing lever 31, and the second magnetic portion 43 is placed on the lower side of the permanent magnet 41.

The movable body 30 in the input device 1B may have the swing lever 31 as well as a flat slider 32, which slides along a plane (an XY plane, for example) crossing the up-down direction in response to the motion of the swing lever 31. The permanent magnet 41 and second magnetic portion 43 may be attached to the flat slider 32.

The magnetic sensor 51 has the first magnetic sensor 51A and second magnetic sensor 51B as in the input device 1A in the first embodiment. When the upper side of the swing lever 31 is tilted toward, for example, the X2 side in the X1-X2 direction, the lower side of the swing lever 31 moves toward the X1 side in the X1-X2 direction as illustrated in FIG. 8B. Due to the movement of the lower side of the swing lever 31, the flat slider 32 is pressed toward the X1 side in the X1-X2 direction. The flat slider 32 moves in parallel along the surface of a slide flat plate 33 toward the X1 side in the X1-X2 direction.

Since the permanent magnet 41 and second magnetic portion 43 are attached to the flat slider 32, when the flat slider 32 moves in parallel, the permanent magnet 41 and second magnetic portion 43 also moves in parallel toward the X1 side in the X1-X2 direction along with the parallel movement of the flat slider 32. In the input device 1B, even when a swing manipulation is performed by use of the swing lever 31, the distance between the magnetic field generation means 40 and the magnetic sensor 51 in the up-down direction remains unchanged due to the above parallel movement. Thus, in the swing manipulation, the linearity of the magnetic field component detected by the magnetic sensor 51 is enhanced.

Figure 9:
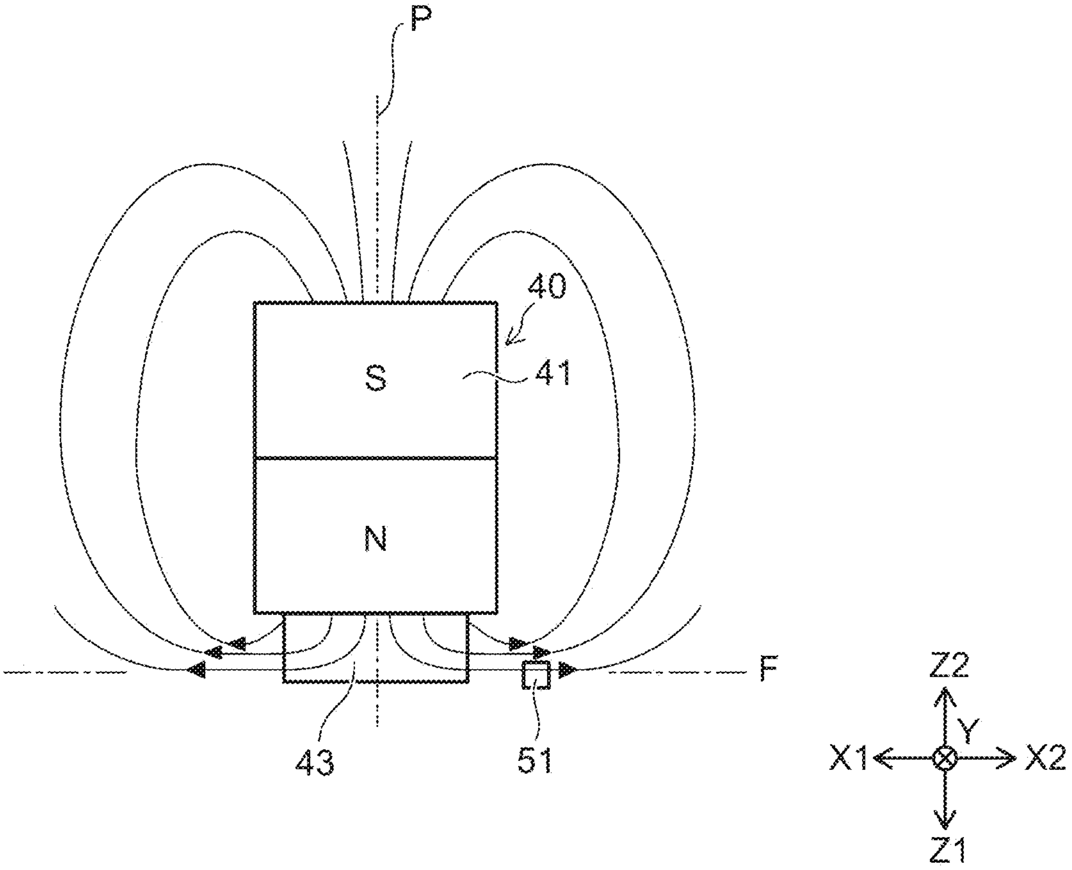
FIG. 9 schematically illustrates a magnetic field generated by a magnetic field generation means of the input device in the second embodiment.

FIG. 9 schematically illustrates a magnetic field generated by a magnetic field generation means of the input device in the second embodiment.

As illustrated in FIG. 9, a magnetic field is generated by the permanent magnet 41, which is included in the magnetic field generation means 40, so that magnetic lines of force draw arcs from the N pole toward the S pole. Since the second magnetic portion 43 is disposed at a position, on the lower side of the permanent magnet 41, at which the virtual central line P of the magnetic field is included in the up-down direction, the N pole of the permanent magnet 41 is induced by side surfaces of the second magnetic portion 43. Therefore, the amount of a component of the magnetic lines of force oriented toward the S pole, the component being along the virtual plane F crossing the virtual central line P from side surfaces of the second magnetic portion 43, is creased. Thus, the S/N ratio of the magnetic field component detected by the magnetic sensor 51 becomes higher than when the second magnetic portion 43 is not provided.

Other Examples of the Magnetic Field Generation Means

Figure 10A:
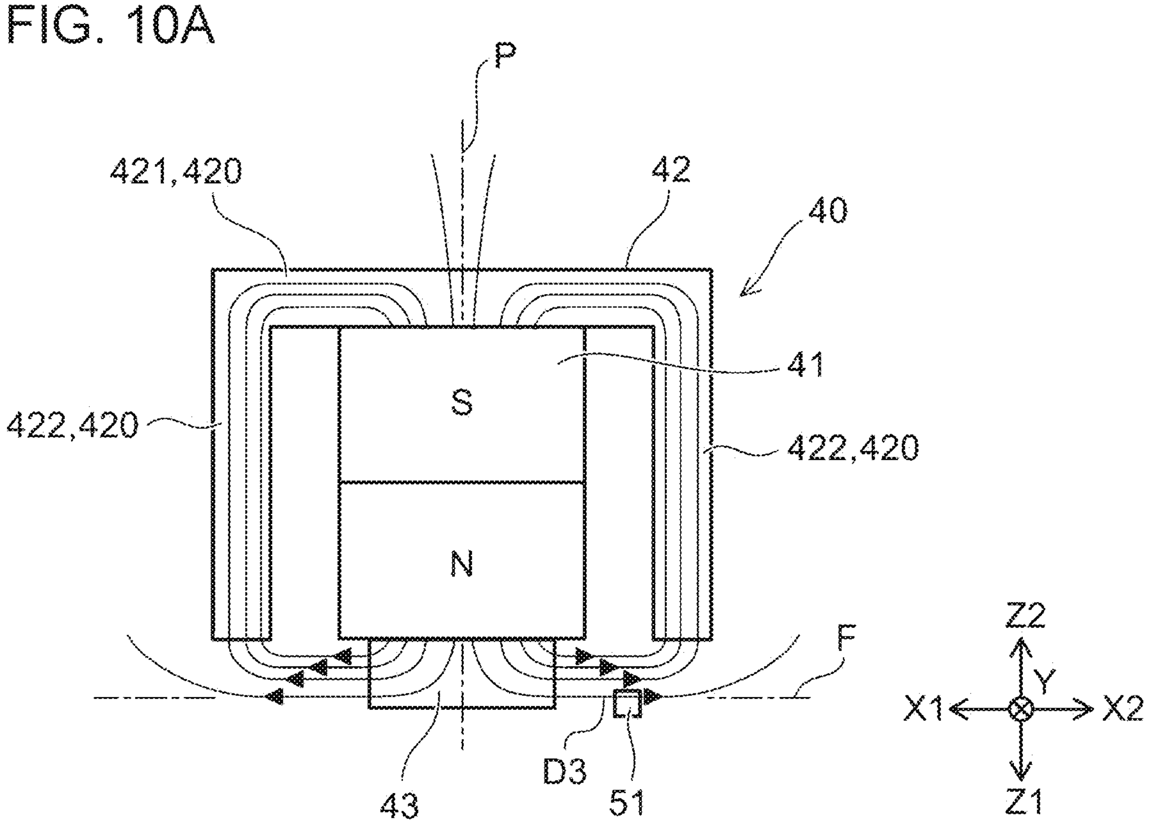
FIG. 10A schematically illustrates another example of the magnetic field generation means.
Figure 10B:
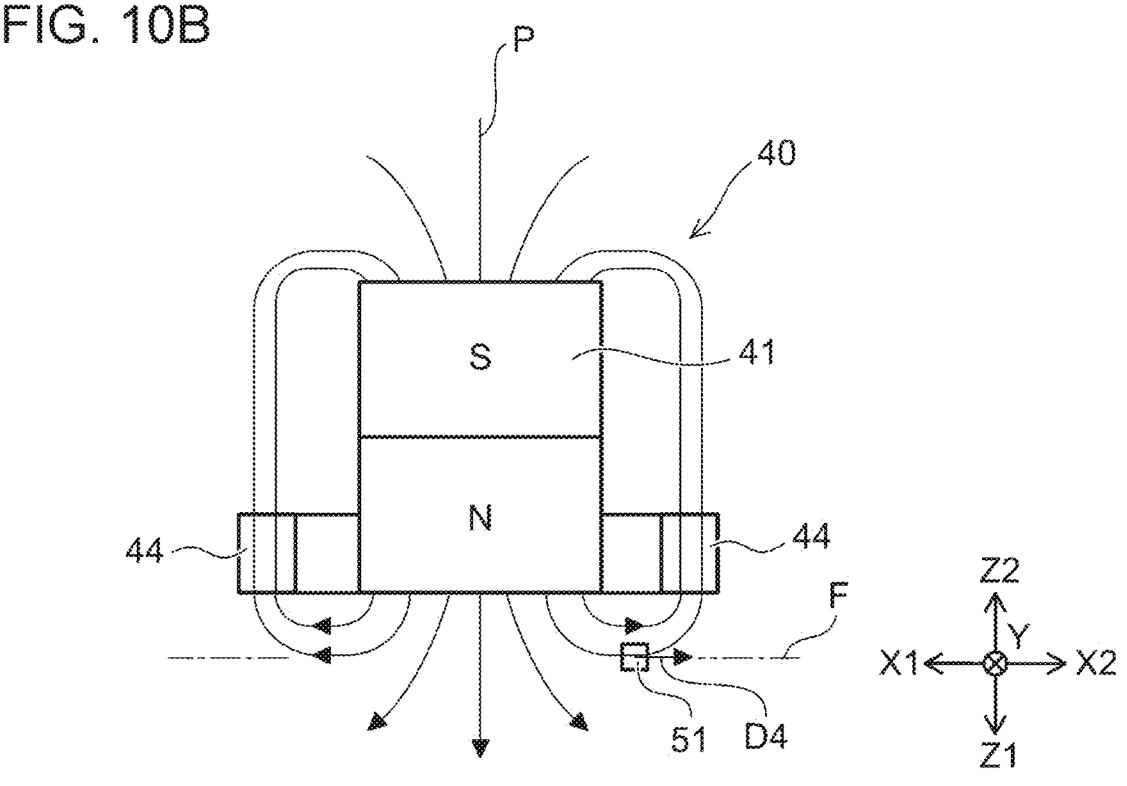
FIG. 10B schematically illustrates yet another example of the magnetic field generation means.

FIGS. 10A and 10B schematically illustrate other examples of the magnetic field generation means.

The magnetic field generation means 40 illustrated in FIG. 10A has the permanent magnet 41, first magnetic portion 42, and second magnetic portion 43. Specifically, the first magnetic portion 42 is disposed on the upper side of the permanent magnet 41, and the second magnetic portion 43 is disposed on the lower side of the permanent magnet 41. The first magnetic portion 42 is the yoke member 420, which is composed of the discal top plate 421 and of the ring-shaped magnetic portion 422 formed so as to extend downward from the outer circumference of the discal top plate 421. Since the magnetic field generation means 40 has both the first magnetic portion 42 and the second magnetic portion 43, the magnetic force along the virtual plane F becomes higher than when only any one of the first magnetic portion 42 and second magnetic portion 43 is provided (see the arrow D3 in FIG. 10A), so the S/N ratio of the magnetic field component detected by the magnetic sensor 51 is increased.

The magnetic field generation means 40 illustrated in FIG. 10B has the permanent magnet 41 and a third magnetic portion 44. The third magnetic portion 44 is ring-shaped so as to enclose the periphery of the lower pole (the N pole, for example) of the permanent magnet 41. The ring-shape of the third magnetic portion 44 does not necessarily need to be continuous in the circumferential direction. For example, the third magnetic portion 44 may have a C-ring shape or half-ring shape, in which part of the third magnetic portion 44 is cut out in the circumferential direction. Since the third magnetic portion 44 of this type is provided, when magnetic lines of force are oriented from the lower end of the N pole toward the S pole, the magnetic lines of force are induced by the third magnetic portion 44. Thus, the magnetic force along the virtual plane F becomes higher than when the third magnetic portion 44 is not provided as in FIG. 4A (see the arrow D4 in FIG. 10B). This increases the S/N ratio of the magnetic field component detected by the magnetic sensor 51.

In the input devices 1A and 1B, in the embodiments described above, that detect the state of the movement of the movable body 30 according to a change in the direction of a magnetic field, a sufficient S/N ratio can be obtained with the magnetic sensor 51.

This completes the description of the first and second embodiments of the present invention. However, the present invention is not limited to examples in these embodiments. For example, although in the first and second embodiments, the swing lever 31 is provided so as to be tiltable around the rotational axes AX1 and AX2, each of which is taken as a central axis, the swing lever 31 may be provided so as to be tiltable with only a single axis taken as a rotational axis. Furthermore, the flat slider 32 used in the input device 1B in the second embodiment may be used in the input device 1A in the first embodiment. In this case, the flat slider 32 may double as the yoke member 420. The scope of the present invention also includes embodiments obtained as a result of appropriately adding or deleting constituent elements to or from the above first and second embodiments, appropriately performing design changes to the above first and second embodiments, or appropriately combining features of the exemplary structures in the above first and second embodiments without departing from the intended scope of the present invention; the addition, deletion, design change, or combination is effected by a person having ordinary skill in the art.

What is claimed is:

1. An input device comprising:

a fixed base;

a case positioned on an upper side of the fixed base, the upper side being one side in a direction of a normal to the fixed base;

a movable body supported on the upper side of the fixed base by the case so as to be movable in a direction crossing the direction of the normal;

a magnetic field generation assembly configured to generate a magnetic field oriented toward a lower side, which is another side in the direction of the normal, the magnetic field generation assembly being attached to the movable body; and a magnetic field direction detection assembly configured to detect a direction of a magnetic field component of the magnetic field along a virtual plane crossing an up-down direction, the magnetic field direction detection assembly being disposed at a position, on the fixed base, other than a position of a virtual central line of the magnetic field with the movable body being at a reference position, wherein the magnetic field generation assembly includes:

a permanent magnet, one pole of the permanent magnet facing downward; and a magnetic metal member placed apart from the virtual central line of the magnetic field via a space that is provided between the magnetic metal member and the permanent magnet.

2. The input device according to claim 1, wherein the magnetic metal member is a yoke member, the yoke member is configured with a discal top plate and a ring-shaped magnetic portion formed so as to extend downward from an outer circumference of the discal top plate, and the permanent magnet is attached to a lower surface of the discal top plate.

3. The input device according to claim 2, wherein the ring-shaped magnetic portion is formed so as to extend downward while being widened toward a lower end of the ring-shaped magnetic portion.

4. The input device according to claim 2, wherein a diameter of the discal top plate is equal to a diameter of the permanent magnet.

* * * * *